United States Patent
Geukes et al.

(10) Patent No.: US 9,202,060 B2
(45) Date of Patent: Dec. 1, 2015

(54) METHOD FOR SECURE SELF-BOOTING OF AN ELECTRONIC DEVICE

(71) Applicant: International Business Machines Corporation, Armonk, NY (US)

(72) Inventors: Benedikt Geukes, Stuttgart (DE); Heiko Michel, Stuttgart (DE); Matteo Michel, Chemnitz (DE); Manfred Walz, Boeblingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 305 days.

(21) Appl. No.: 13/706,803

(22) Filed: Dec. 6, 2012

(65) Prior Publication Data

US 2013/0173899 A1 Jul. 4, 2013

(30) Foreign Application Priority Data

Jan. 3, 2012 (EP) .................................. 12150059

(51) Int. Cl.
| G06F 9/00 | (2006.01) |
| G06F 15/177 | (2006.01) |
| G06F 21/57 | (2013.01) |
| G06F 21/74 | (2013.01) |
| G06F 21/85 | (2013.01) |

(52) U.S. Cl.
CPC .............. *G06F 21/575* (2013.01); *G06F 21/74* (2013.01); *G06F 21/85* (2013.01); *G06F 2221/2105* (2013.01); *G06F 2221/2107* (2013.01); *G06F 2221/2147* (2013.01)

(58) Field of Classification Search
USPC ........................................................ 713/1, 2
See application file for complete search history.

(56) References Cited

U.S. PATENT DOCUMENTS

| 7,496,813 B1* | 2/2009 | Houlihane et al. ............. 714/724 |
| 2005/0138409 A1* | 6/2005 | Sheriff et al. .................. 713/200 |
| 2006/0136717 A1* | 6/2006 | Buer et al. ..................... 713/155 |
| 2009/0070576 A1* | 3/2009 | Hocking et al. .................. 713/2 |
| 2009/0288160 A1* | 11/2009 | Esliger et al. .................... 726/17 |
| 2010/0199077 A1* | 8/2010 | Case et al. ......................... 713/1 |
| 2010/0217964 A1* | 8/2010 | Peterka et al. .................... 713/2 |

(Continued)

OTHER PUBLICATIONS

Chenghua Yan et al., "An Executable File Encryption Based Scheme for Malware Defense", Intelligent Systems and Applications, ISA 2009, International Workshop on, IEEE, Piscataway, NJ, USA, May 23, 2009, pp. 1-5.

(Continued)

*Primary Examiner* — Zahid Choudhury
(74) *Attorney, Agent, or Firm* — Matthew C. Zehrer

(57) ABSTRACT

The present invention relates to a method for a self-boot of an electronic device, wherein an external component is accessible through an interface of the electronic device (101), the method comprising, determining a boot mode for booting the electronic device, wherein the determined boot mode is defined as a secure boot mode; disabling the interface, thereby prohibiting access to the component through the interface, thereby defining a secure state of the electronic device; loading a first code comprising a sequence of executable instructions to be executed for booting the electronic device; loading a second code, the second code being encrypted; and decrypting the second code and executing the second code, thereby enabling the interface, and switching the electronic device from the secure state to a debugging state.

17 Claims, 2 Drawing Sheets

(56) References Cited

U.S. PATENT DOCUMENTS

2011/0066835 A1   3/2011  Kothari et al.
2012/0079287 A1*  3/2012  Leclercq ..................... 713/192

OTHER PUBLICATIONS

International Search Report and Written Opinion of the ISA dated Jan. 31, 2013—International Application No. PCT/EP2012/073666.

* cited by examiner

METHOD FOR SECURE SELF-BOOTING OF AN ELECTRONIC DEVICE

FIELD OF THE INVENTION

The invention relates to semiconductor integrated circuits, and particularly to a method for secure self-booting of an electronic device.

BACKGROUND OF THE INVENTION

Integrated circuit devices often are fabricated and configured to store secure information, such as an encryption/decryption key. Debug interfaces in such integrated circuit devices may be a source of a security risk in that they can be manipulated for unauthorized access to internal components such as memories and the sensitive information of the integrated circuit device. To avoid this, the manufacturer may disable access to the integrated circuit through the debug interfaces by blowing a fuse associated with the debug interfaces. However, the integrated circuit device may be defective, and thus, needs evaluation. In this case, the conventional methods propose complex techniques to unlock the debug interfaces and to allow again access to the integrated circuit device via external components to the integrated circuit device. This also requires, for security reason, that the integrated circuit has a prior configuration capability without external support.

SUMMARY OF THE INVENTION

It is an objective of embodiments of the invention to provide for an improved computer-implemented method, data processing system and corresponding computer-readable storage medium secure self-boot of an electronic device. It should relate to the purpose specified in claim 1. Said objective is solved by the subject matter of the independent claims. Advantageous embodiments are described in the dependent claims.

The term "computer-readable storage medium," as used herein encompasses any tangible storage medium which may store instructions which are executable by a processor of a computing device. The computer-readable storage medium may be referred to as a computer-readable non-transitory storage medium. The computer-readable storage medium may also be referred to as a tangible computer readable medium. In some embodiments, a computer-readable storage medium may also be able to store data which is able to be accessed by the processor of the computing device. Examples of computer-readable storage media include, but are not limited to: a floppy disk, punched tape, punch cards, a magnetic hard disk drive, a solid state hard disk, flash memory, a USB thumb drive, Random Access Memory (RAM), Read Only Memory (ROM), an optical disk, a magneto-optical disk, and the register file of the processor. Examples of optical disks include Compact Disks (CD) and Digital Versatile Disks (DVD), for example CD-ROM, CD-RW, CD-R, DVD-ROM, DVD-RW, or DVD-R disks. The term computer readable-storage medium also refers to various types of recording media capable of being accessed by the computer device via a network or communication link. For example data may be retrieved over a modem, over the internet, or over a local area network. References to a computer-readable storage medium should be interpreted as possibly comprising multiple computer-readable storage mediums. Various executable components of a program or programs may be stored in different locations. The computer-readable storage medium may for instance comprise multiple computer-readable storage medium within the same computer system. The computer-readable storage medium may also be computer-readable storage medium distributed amongst multiple computer systems or computing devices.

The term "Computer memory" or "memory" is an example of a computer-readable storage medium. Computer memory is any memory which is accessible by a processor. Examples of computer memory include, but are not limited to: RAM memory, registers, and register files. In some instances a computer memory may also include: a hard disk drive, a floppy drive or a solid state hard drive. For instance, part of a memory may in fact be swap space on a hard drive. References to "computer memory" or "memory" should be interpreted as possibly comprise multiple memories. The memory may for instance comprise multiple memories within the same computer system. The memory may also comprise multiple memories distributed amongst multiple computer systems or computing devices.

The term "processor" as used herein encompasses an electronic component which is able to execute a program or machine executable instruction. References to the computing device comprising "a processor" should be interpreted as possibly containing more than one processor or processing core. The processor may for instance be a multi-core processor. A processor may also refer to a collection of processors within a single computer system or distributed amongst multiple computer systems.

The term "POR" as used herein stands for Power-On-Reset.

The term "ROM" as used herein stands for Read-Only-Memory.

The term "Asset protection" as used herein refers to a function that ensures only individual units can be accessed/use in an electronic device.

The term "chip" as used herein refers to an integrated circuit chip. Circuits and circuitry may comprise general or specific purpose hardware, or may comprise hardware and associated software such as firmware or object code. In particular, a chip may be an ASIC (Application Specific Integrated Circuit) or a SOC (System on a Chip). Chip's components include all the circuit elements necessary for implementing a logic circuit, such as sequential logic (e.g. latches).

The term "eFuse" as used herein refers to a storage element that comprises for example an electronic fuse. The electronic fuse may be incorporated into an integrated circuit. Once blown, the eFuse cannot easily be reversed or altered.

The term "electronic device" as used herein refers to a collection of circuits, electronic components, or combinations thereof that collectively, when connected together, performs a desired function. An electronic device may include, or be part of, a system. The electronic device may be, for example, a chip.

In one aspect the present invention relates to a method for self-boot of an electronic device, wherein components of the electronic device are accessible through interfaces of the electronic device, the method comprising:

determining a boot mode for booting the electronic device, wherein the determined boot mode is a secure boot mode;

disabling the interfaces, thereby prohibiting access to the components of the electronic device through the interfaces, thereby defining a secure state of the electronic device;

loading a first code, the first code comprising a sequence of executable instructions to be executed for booting the electronic device;

loading a second code, the second code being encrypted; and decrypting the second code and executing the second code, thereby enabling the interfaces, thereby switching from the secure state of the electronic device to a debugging state of the electronic device.

Secure, in this context would mean e.g. that data in the chip is not accessible via the chip interfaces. The data may be only readable outside the chip via x-ray inspection or measuring of radiation. Secure keys are readable or reproducible via a physical tampering with the chip, such as a destructive access by removing metal layers of the chip. Secure would not necessarily mean that the chip can withstand physical attacks and that it works correctly thereafter.

Said embodiments may be advantageous, because they allow for a self-booting in a secure boot mode without external support. This is not the case in prior arts, where a trusted boot concept from e.g. a cell processor is using an external component such as FSP (Flexible Service Processor) to boot the electronic device. Another advantage being that the self-booting process is based on the execution of a trusted code which is stored in the electronic device. The second code can change the state of the electronic device, for example, from the secure state to the debugging state. The debugging state is a limited unsecure state (i.e. not fully secure state) of the electronic device. In the debugging state the interfaces are enabled and thus allowing external access from outside the electronic device to the electronic device for debugging purpose such as inspection of registers of the electronic device. However, the external access to secure memories of the electronic device through the interfaces is still prohibited. This is in contrast to the conventional method, because the change of the secure state of the electronic device is not possible from within the electronic device. It always requires a request from an external source providing a key to some logic that can use the key for granting access to that requestor.

According to another embodiment, the method further comprises performing an initial operation of a power-on-reset to bring the electronic device to a state to begin boot operations.

According to embodiments, the method further comprises detecting a power applied to the electronic device and generating a reset impulse that goes to the entire electronic device placing it into the state to begin the boot operations.

According to another embodiment, the determining step further comprises:
reading the boot mode from an eFuse, wherein the boot mode comprises a regular boot mode and the secure boot mode;
evaluating the boot mode for determining the boot mode as the secure boot mode.

The eFuse is burned with a predetermined set of bits that define various modes such as regular mode, secure mode, configuring of pieces of analog circuitry, etc. The eFuse is read from a POR engine during the reset phase and stored in state memory that permits or prohibits security-related functions during the continuing course of boot process.

According to another embodiment, the interfaces are disabled while the boot mode is evaluated. According to another embodiment, the first code is loaded from an internal read only memory.

According to another embodiment, the second code is loaded from outside the electronic device through a functional interface, wherein the secure state of the electronic device remains unchanged when enabling and/or disabling the functional interface.

According to embodiments, the functional interface is disabled while the boot mode is evaluated. The functional interface is enabled again prior to a processing unit takes over the POR engine following the boot process. Thus, the processing unit may load the second code through the functional interface.

Said embodiments may be advantageous, because the secure state of the electronic device is not altered when enabling/disabling the functional interface.

According to another embodiment, the method steps of the present invention are executed by said electronic device, said electronic device being in functional mode.

Said embodiments may be advantageous in that at the usage stage, an electronic device costumer is able, for example, to boot the electronic device without a need of external support. There is only a need of a voltage to be applied and the reset to be released.

According to another embodiment, the method further comprises providing a procedure to set the electronic device into manufacturing test mode to debug field-returns.

Once the electronic device is burned as secure, it is possible to burn an additional eFuse to force the test mode. The POR engine in its hardwired part enforces the electronic device to be run in test mode. In this case, debugging is only possible by special silicon tester hardware. However, it is not possible to apply functional clocks. In this test mode, access to the electronic device is only possible through dedicated test pins. The interfaces are disabled.

According to another embodiment, the method further comprises a step of providing the second code as a Low Level Boot code LLB.

According to another embodiment, the enabling step further comprises:
providing a handshake register, the handshake register comprising a predefined sequence of bit values, wherein each of the bit values is indicative of a security state of the electronic device; and
setting a bit value indicative of the debugging state, thereby enabling switching between the secure state of the electronic device and the debugging state of the electronic device.

Said embodiments may be advantageous in that they allow unlocking of the electronic device for trusted customers (e.g. for debugging purpose). This is possible by just running the second encrypted code on the processing unit of the electronic device.

According to another embodiment, the method further comprises providing a selective disabling of one or more of the components of the electronic device.

An eFuse configuration vector may be used by the POR engine to disable individual units within the electronic device.

Said embodiments may be advantageous, because they allow for asset protection. Depending on the business model, an electronic device is sold to multiple external customers. To support different configurations, however to maintain a common superset design, hardware units are individually locked.

In a further aspect, the invention relates to a computer-readable non-transitory storage medium comprising computer-readable instructions which, when executed by a processor, cause the processor to perform the method steps of anyone of the above embodiments.

In another aspect, the invention relates to a self-booting device, the device comprising:
one or more interfaces;
one or more components being accessible through the one or more interfaces;

a POR engine adapted for determining a boot mode for booting the electronic device, wherein the determined boot mode is a secure boot mode; wherein the POR engine is further adapted for disabling the interfaces, thereby prohibiting access to the components of the electronic device through the interfaces, thereby defining a secure state of the electronic device;

a processing unit adapted for loading a first code, the first code comprising a sequence of executable instructions to be executed by a processing unit for booting the electronic device;

the processing unit being further adapted for loading a second code, the second code being encrypted; and for decrypting the second code and executing the second code, thereby enabling the interfaces, thereby switching from the secure state of the device to a debugging state of the electronic device.

BRIEF DESCRIPTION OF THE DRAWINGS

In the following, preferred embodiments of the invention will be described in greater detail by way of example only making reference to the drawings in which.

DETAILED DESCRIPTION

In the following, like numbered elements in these figures are either similar elements or perform an equivalent function. Elements which have been discussed previously will not necessarily be discussed in later figures if the function is equivalent.

Figure 1:
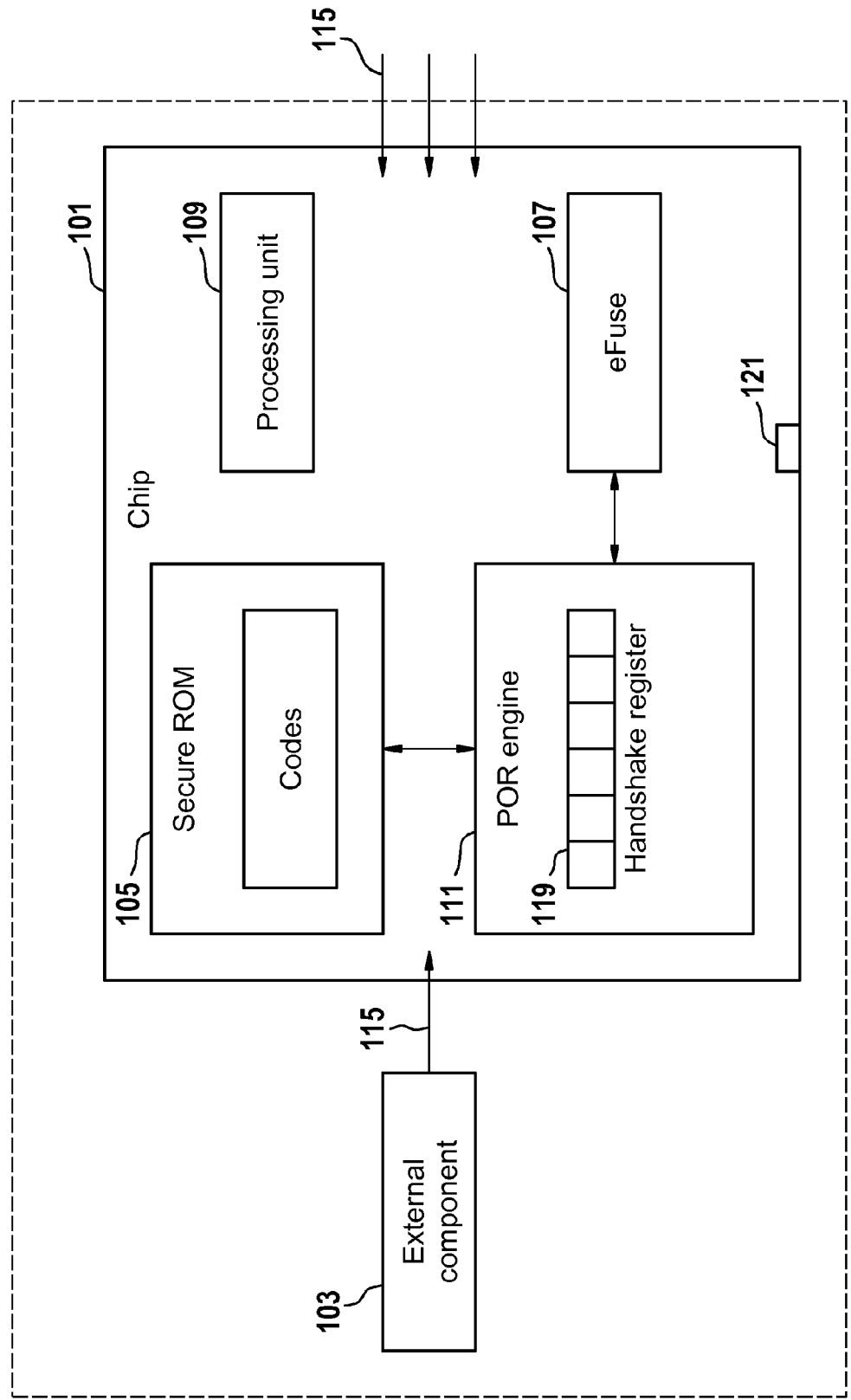
FIG. 1 illustrates a system architecture for the execution of a method for secure self-boot of an electronic device.

FIG. 1 is a block diagram of a secure apparatus, comprising a chip 101 and an external component 103. The chip 101 comprises a secure ROM (read only memory) 105, eFuse 107, processing unit 109, test pins 121 and a POR engine 111. The eFuse 107 stores security settings of the chip, indicating whether hardware security is enabled.

The chip 101 communicates with the external components 103 through an interface 115. The interface 115 comprises a debug interface and/or functional interface. The debug interface allows access to the chip 101 to protocols/devices which may act as external masters to the chip 101. The debug interface may be, for example a JTAG (Joint Test Action Group), UART (Universal Asynchronous Receiver/Transmitter), I2C, FSI or EMI (External Memory Interface). The debug interface may allow external access from outside the chip 101 to the chip 101 for debugging purpose such as inspection of a register of the chip 101. However the external access to a secure memory of the chip 101 through the debug interface is still prohibited. The functional interface allows the protocols/devices from internal to act as a master on the chip. The functional interface may be for example an I2C, an Ethernet or a PCI express. The functional interface acts as a master on the chip 101.

Upon reset, the POR engine 111 may access the security setting in eFuse 107, and reads the boot mode which is predetermined in the eFuse 107. If the boot mode indicates a secure mode, the POR engine 111 may disable the interface 115. The POR engine 111 may further execute instructions from the secure ROM 105 in order to initialize the processing unit 109 so that the processing unit 109 can take over following a boot process. The secure ROM 105 comprises a first code. The first code is loaded by the processing unit 109. The first code causes the processing unit 109 to load a second code from THE external component 103 through the functional interface to the external component 103. The functional interface is enabled by the processing unit 109. The external component 103 may be, for example, NAND Flash, NOR Flash, inter-integrated circuit (I2C) EEPROM, serial peripheral interface (SPI) EEPROM, MultiMedia card/secure data memory card (MMC/SD) or universal serial bus (USB)). The second code is encrypted. The processing unit 109 executes the first code in order to decrypt the second encrypted code. The second code may enable a user application, a system application, and/or an operating environment (e.g. operating system) for a device that supports a user or a system application. The POR engine 111 provides a handshake register 119. The handshake register 119 comprises a predefined sequence of bit values. Each of the bit values is indicative of a security state of the chip 101.

The handshake register 119 may be written during the boot process. Finally, the second code may set a bit value indicative of a debugging state of the chip 101. The debugging state of the chip 101 is a limited unsecure state (i.e. not fully secure state) of the chip 101. This is due to the fact that the predefined sequence of bit values may enable the interface 115 and thus allow external access to the chip 101 from outside the chip 101. However the external access to a secure memory of the chip 101 is still prohibited. For further locking of the interface 115 only the bit value of the handshake register 109 needs to be overwritten.

Figure 2:
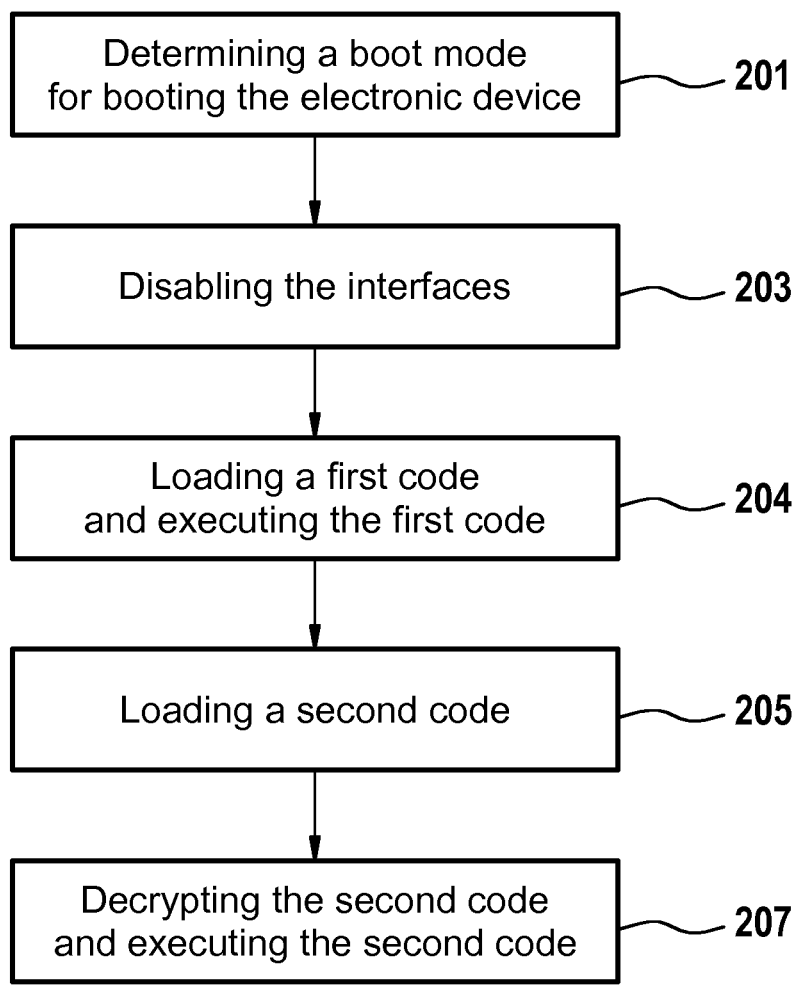
FIG. 2 is a flowchart of a method for secure self-boot of an electronic device.

FIG. 2 is a flowchart for secure self-boot of an electronic device, wherein components of the electronic device are accessible through an interface of the electronic device.

After performing an initial operation of a power-on-reset to bring the electronic device to a state to begin boot operations, a POR engine, in step 201, determines a boot mode for booting the electronic device. The determined boot mode is a secure boot mode. The boot mode is read from an eFuse. In step 203, the POR engine disables the interface, such that the access to components of the electronic device through interface is prohibited. The electronic device is then in a secure state.

After being initialized, a processing unit, in step 204, loads from a secure ROM a first code. The first code comprises a sequence of executable instructions to be executed by the processing unit for booting the electronic device After releasing a functional interface to an external component, the processing unit, in step 205, loads a second code from the external component through a functional interface. The second code is encrypted. The secure state of the electronic device remains unchanged when enabling and/or disabling the functional interface.

In step 207, the processing unit executes the first code in order to decrypt the second code by using, for example, a cryptographic key. Next, the processing unit executes the second code. This may enable the interface, and thus cause a switch of the secure state of the electronic device to a debugging state of the electronic device. In this debugging state, the electronic device may be debugged even in a functional mode. The second code may allow for a further disabling of the interface.

It is also possible to burn an additional eFuse for a test mode purpose, for example, to debug field-returns. The POR engine in its hardwired part then enforces the electronic device to be run in test mode. In this case, debugging is possible by special silicon tester hardware. In the test mode, access to the electronic device is only possible through dedicated test pins 121. The interfaces are disabled.

The invention claimed is:

1. A method for a self-boot of an electronic device, wherein an external component is accessible through an interface of the electronic device, the method comprising:
   determining a boot mode for booting the electronic device, wherein the determined boot mode is evaluated and defined as a secure boot mode, wherein determining the boot mode for booting the electronic device further comprises: reading the boot mode from an eFuse, wherein the boot mode comprises a regular boot mode and the secure boot mode, and wherein electronic device data is not accessible through the interface in secure boot mode;
   disabling the interface, thereby prohibiting access to the component through the interface, thereby defining a secure state of the electronic device;
   loading a first code comprising a sequence of executable instructions to be executed for booting the electronic device;
   loading a second code, the second code being encrypted; and
   decrypting the second code and executing the second code, thereby enabling the interface, and switching the electronic device from the secure state to a debugging state.

2. The method according to claim 1 further comprising performing an initial operation of a power-on-reset to bring the electronic device to a state to begin boot operations.

3. The method according to claim 1, wherein the interface is disabled while the boot mode is evaluated.

4. The method according to claim 1, wherein the second code is loaded from outside the electronic device through one functional interface, wherein the secure state of the electronic device remains unchanged when enabling and/or disabling the functional interface.

5. The method according to claim 1 further comprising setting the electronic device into manufacturing test mode to debug fieldreturns.

6. The method according to claim 1 further comprising providing the second code as a Low Level Boot code LLB.

7. The method according to claim 1, wherein decrypting the second code and executing the second code, thereby enabling the interface, further comprises:
   providing a handshake register, the handshake register comprising a predefined sequence of bit values, wherein each of the bit values is indicative of a security state of the electronic device; and
   setting a bit value indicative of the debugging state, thereby enabling switching between the secure state of the electronic device and the debugging state of the electronic device.

8. The method according to claim 1 further comprising selectively disabling of one or more of the components of the electronic device.

9. A self-booting device, the device comprising:
   one or more interfaces;
   one or more external components being accessible through the one or more interfaces;
   a POR engine adapted for determining a boot mode for booting the electronic device, wherein the determined boot mode is evaluated and defined as a secure boot mode, wherein the boot mode is determined by reading the boot mode from an eFuse, wherein the boot mode comprises a regular boot mode and the secure boot mode, and wherein electronic device data is not accessible through the interface in secure boot mode; wherein the POR engine is further adapted for disabling the interfaces, thereby prohibiting access to the components through the interfaces, thereby defining a secure state of the electronic device;
   a processing unit adapted for loading a first code comprising a sequence of executable instructions to be executed by the processing unit for booting the electronic device;
   the processing unit being further adapted for loading a second code, the second code being encrypted; and for decrypting the second code and executing the second code, thereby enabling the interfaces and switching the electronic device from the secure state to a debugging state.

10. A computer-readable non-transitory storage medium comprising self-boot computer readable instructions for an electronic device comprising an interface for which to access an external component, the instructions which, when executed by the electronic device cause the electronic device to:
    determine a boot mode for booting the electronic device, wherein the determined boot mode is evaluated and defined as a secure boot mode, wherein the boot mode is determined by reading the boot mode from an eFuse, wherein the boot mode comprises a regular boot mode and the secure boot mode, and wherein electronic device data is not accessible through the interface in secure boot mode;
    disable the interface, thereby prohibiting access to the external component through the interface, thereby defining a secure state of the electronic device;
    load first program instructions comprising a sequence of executable instructions to be executed for booting the electronic device;
    load second program instructions, the second program instructions being encrypted; and
    decrypt the second program instructions and execute the second program instructions, thereby enabling the interface, and switching the electronic device from the secure state to a debugging state.

11. The computer-readable non-transitory storage medium of claim 10, wherein the program instructions further cause the electronic device to:
    perform an initial operation of a power-on-reset to bring the electronic device to a state to begin boot operations.

12. The computer-readable non-transitory storage medium of claim 10, wherein the interface is disabled while the boot mode is evaluated.

13. The computer-readable non-transitory storage medium of claim 10, wherein the second program instructions are loaded from outside the electronic device through the interface, and wherein the secure state of the electronic device remains unchanged when enabling and/or disabling the functional interface.

14. The computer-readable non-transitory storage medium of claim 10, wherein the program instructions further cause the electronic device to:
    set the electronic device into manufacturing test mode to debug fieldreturns.

15. The computer-readable non-transitory storage medium of claim 10, wherein the program instructions further cause the electronic device to:
    provide the second program instructions as a Low Level Boot code LLB.

16. The computer-readable non-transitory storage medium of claim 10, wherein the program instructions that decrypt the second program instructions and execute the second program instructions, thereby enabling the interface, further cause the electronic device to:

provide a handshake register, the handshake register comprising a predefined sequence of bit values, wherein each of the bit values is indicative of a security state of the electronic device; and set a bit value indicative of the debugging state, thereby enabling switching between the secure state of the electronic device and the debugging state of the electronic device.

17. The computer-readable non-transitory storage medium of claim 10, wherein the program instructions further cause the electronic device to:

selectively disable of one or more of the components of the electronic device.

\* \* \* \* \*